US012284734B2

(12) United States Patent
Wang

(10) Patent No.: US 12,284,734 B2
(45) Date of Patent: Apr. 22, 2025

(54) DRIVING CONTROL DEVICE FOR LED FAN LAMP

(71) Applicant: Peng Wang, Shenzhen (CN)

(72) Inventor: Peng Wang, Shenzhen (CN)

( * ) Notice: Subject to any disclaimer, the term of this patent is extended or adjusted under 35 U.S.C. 154(b) by 0 days.

(21) Appl. No.: 18/810,574

(22) Filed: Aug. 21, 2024

(65) Prior Publication Data

US 2024/0414822 A1 Dec. 12, 2024

(51) Int. Cl.
*H05B 45/20* (2020.01)
*H05B 45/30* (2020.01)
*H05B 45/325* (2020.01)
*H05B 45/54* (2020.01)

(52) U.S. Cl.
CPC ........... *H05B 45/325* (2020.01); *H05B 45/20* (2020.01); *H05B 45/54* (2020.01)

(58) Field of Classification Search
CPC ........ H05B 45/10; H05B 45/20; H05B 45/30; H05B 45/325; H05B 45/37; H05B 45/54; H05B 47/10; H05B 47/105; H05B 47/17; H05B 47/24; H05B 47/197
See application file for complete search history.

(56) References Cited

U.S. PATENT DOCUMENTS 10,212,779 B1 * 2/2019 Herbst ................. H05B 45/395
11,395,395 B2 * 7/2022 Park ....................... H05B 45/44
2011/0285289 A1 * 11/2011 Tremblay .............. F21V 23/005 315/35
2013/0038244 A1 * 2/2013 Kamii .................... H05B 45/20 315/297
2013/0249406 A1 9/2013 Kim et al.
2015/0022100 A1 1/2015 Zhang et al.
2015/0327340 A1 * 11/2015 Siessegger ........... H05B 45/375 315/200 R
2016/0135261 A1 5/2016 Chen et al.
2016/0227616 A1 * 8/2016 Lee ...................... H05B 47/105
2019/0215927 A1 * 7/2019 Sooch .................... H05B 47/16
2021/0259075 A1 * 8/2021 Yanev .................. H05B 47/165

FOREIGN PATENT DOCUMENTS

CN 218679438 U * 3/2023

* cited by examiner

*Primary Examiner* — Thai Pham
(74) *Attorney, Agent, or Firm* — Hemisphere Law, PLLC; Zhigang Ma

(57) ABSTRACT

The present disclosure provides a driving control device for a light-emitting diode (LED) fan lamp, including a micro control unit (MCU) and at least two LED driving control circuits; the MCU is configured to selectively output a pulse width modulation (PWM) signal to the at least two LED driving control circuits according to a control instruction, to drive LED modules in the corresponding LED driving control circuits; the control instruction at least includes a night light mode instruction; and the MCU controls, according to the night light mode instruction, some of the LED driving control circuits to be turned off. The driving control device for the LED fan lamp has a simple structure, is stable in LED driving control, and can achieve a free combination display effect of a plurality of groups of LED modules.

6 Claims, 3 Drawing Sheets

DRIVING CONTROL DEVICE FOR LED FAN LAMP

TECHNICAL FIELD

The present disclosure relates to the technical field of light-emitting diodes (LEDs), and in particular, to a driving control device for an LED fan lamp.

BACKGROUND

In the technical field of LEDs, LED lighting can be applied to more and more scenarios. For example, an LED fan lamp has a combined lighting mode of multiple groups of LED modules. In this mode, there is usually a problem: At low current, if the multiple groups of LED modules are combined for lighting, the current is shared, so that the LED modules all have low current. As a result, LED lighting flickering and instability are caused, which affects the user experience and shortens the life span of LED equipment. There is a need for a technical solution for improvement.

SUMMARY

In view of the above contents, the present disclosure aims to at least solve one of the technical problems in the prior art. To this end, the present disclosure provides a driving control device for an LED fan lamp, which achieves stable driving, has a good effect and a simple structure, and is suitable for large-scale industrial production and application.

To this end, in a first aspect, the present disclosure provides a driving control device for an LED fan lamp, including a micro control unit (MCU) and at least two LED driving control circuits; the MCU is configured to selectively output a pulse width modulation (PWM) signal to the at least two LED driving control circuits according to a control instruction, to drive LED modules in the corresponding LED driving control circuits; the control instruction at least includes a night light mode instruction; and the MCU controls, according to the night light mode instruction, some of the LED driving control circuits to be turned off.

Preferably, each LED driving control circuit includes:

- an input module, configured to input alternating current power;
- a rectifier module, configured to convert the alternating current power into direct current power;
- a filtration module, configured to smooth the direct current power to obtain working power;
- a driving control chip, configured to: receive the working power, receive an external PWM signal, and output a driving signal according to the PWM signal; and
- an LED module, configured to: receive the working power and the driving signal, and be driven to be lightened.

Preferably, the driving control chip includes a high-voltage input (HV) pin, a PWM signal pin, and a driving DRAIN pin; the HV pin is electrically connected to a high voltage output end of the filtration module; the PWM signal pin is configured to receive the external PWM signal; the DRAIN pin is electrically connected to a negative electrode of the LED module; and the high voltage output end of the filtration module is electrically connected to a positive electrode of the LED module.

Preferably, the driving control chip further includes a ground (GND) pin; and/or,

- the driving control chip further includes an open circuit overvoltage protection (ROVP) pin, and the ROVP pin is grounded through a first resistor R1; and/or,
- the driving control chip further includes a current sensing (CS) pin, and the CS pin is grounded through a second resistor R2; and/or,
- the PWM signal pin is further grounded through a third resistor R3.

Preferably, the driving control chip further includes a VCC power supply unit and a VCC undervoltage protection and power-on reset unit; the HV pin is electrically connected to the VCC undervoltage protection and power-on reset unit through the VCC power supply unit; and/or,

- the driving control chip further includes a PWM dimming unit and a constant current control and logic control unit; the PWM dimming unit is electrically connected to the constant current control and logic control unit; and/or,
- the driving control chip further includes an overtemperature adjustment unit and a constant current control and logic control unit; the overtemperature adjustment unit is electrically connected to the constant current control and logic control unit; and/or,
- the driving control chip further includes an overvoltage protection (OVP) unit and a constant current control and logic control unit; the ROVP pin is electrically connected to the constant current control and logic control unit through the OVP unit; and/or,
- the driving control chip further includes a leading edge blanking unit, a current sampling unit, and an N-metal oxide semiconductor (N-MOS) transistor; an input end of the current sampling unit is electrically connected to the CS pin; an output end of the current sampling unit is electrically connected to the constant current control and logic control unit; a gate G of the N-MOS transistor is electrically connected to an input end of the constant current control and logic control unit and an input end of the leading edge blanking unit; an output end of the leading edge blanking unit is electrically connected to the constant current control and logic control unit; a drain D of the N-MOS transistor is electrically connected to the DRAIN pin; and a source S of the N-MOS transistor is electrically connected to the input end of the current sampling unit.

Preferably, the LED module includes an LED light string Dn, a first diode D1, an energy storage inductor L, and a first capacitor C1; a high-voltage output end of the filtration module is electrically connected to a positive electrode of the LED light string Dn, a first end of the first capacitor C1, and a negative electrode of the first diode D1; a negative electrode of the LED light string Dn and a second end of the first capacitor C1 are electrically connected to the DRAIN pin through the energy storage inductor L; and a positive electrode of a freewheeling diode is electrically connected to the DRAIN pin.

Preferably, the filtration module includes a second capacitor C2; a first end of the second capacitor C2 is electrically connected to a high voltage output end of the rectifier module and the high voltage output end of the filtration module; and a second end of the second capacitor C2 is grounded.

Preferably, the rectifier module includes a second diode D2, a third diode D3, a fourth diode D4, and a fifth diode D5; a positive electrode of the second diode D2 and a positive electrode of the third diode D3 are respectively grounded; a negative electrode of the second diode D2 is electrically connected to a first end of the input module and a positive electrode of the fourth diode D4; a negative electrode of the third diode D3 is electrically connected to a second end of the input module and a positive electrode of the fifth diode D5; and a negative electrode of the fourth diode D4 and a negative electrode of the fifth diode D5 are respectively electrically connected to the high-voltage output end of the rectifier module.

Preferably, the at least two LED driving control circuits at least include a cold light LED driving control circuit and a warm light LED driving control circuit.

Preferably, LED colors of the at least two LED driving control circuits are different from each other.

According to the driving control device for the LED fan lamp provided in the embodiments of the present disclosure, the MCU selectively outputs the PWM signal to the corresponding LED driving control circuits according to the control instruction; the control instruction at least includes a night light mode instruction; and when receiving the night light mode instruction, the MCU correspondingly controls turning off of some of the LED driving control circuits, thereby avoiding the problem of light flickering and instability. The driving control device has a simple overall structure, can achieve stable driving control, lowers a demand for resources, saves resources, and enhances the user experience.

DETAILED DESCRIPTION OF THE EMBODIMENTS

Figure 1:
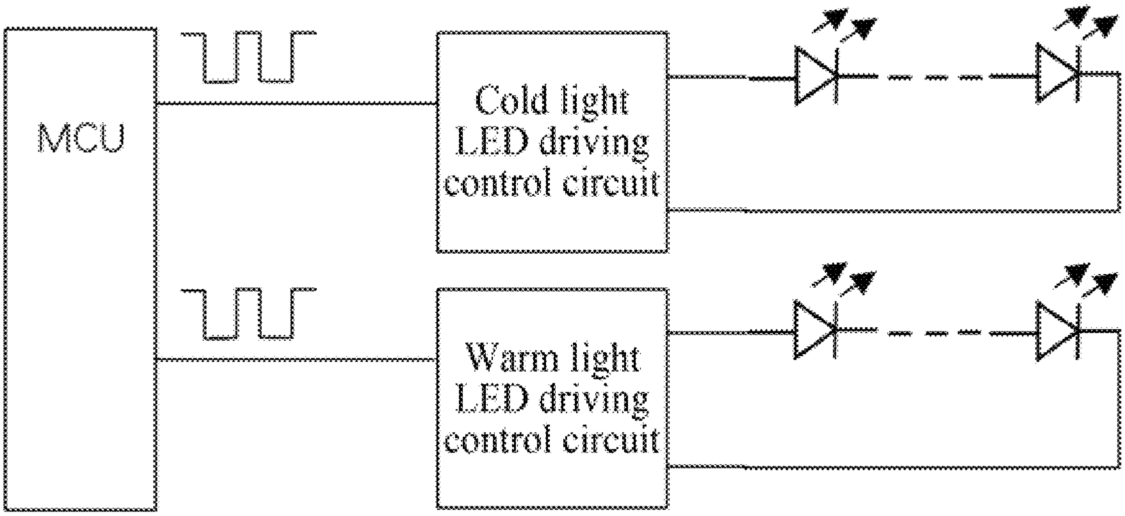
FIG. 1 is a schematic diagram of a circuit structure of a driving control device for an LED fan lamp provided in the embodiments of the present disclosure.

The embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, aim to explain the present disclosure, and should not be construed as a limitation on the present disclosure.

The following disclosure provides many different embodiments or examples to implement different structures of the present disclosure. To simplify the disclosure of the present disclosure, components and settings of specific examples are described below. Of course, they are merely examples and are not intended to limit the present disclosure. In addition, the present disclosure may repeatedly refer to numbers and/or letters in different examples. Such repetition is for purposes of simplicity and clarity and does not itself indicate a relationship between the various embodiments and/or settings discussed. In addition, the present disclosure provides examples of various specific processes and materials, but a person of ordinary skill in the art will recognize the application of other processes and/or the use of other materials.

Referring to FIG. 1, the embodiments of the present disclosure provide a driving control device 200 for an LED fan lamp, including a micro control unit (MCU) and at least two LED driving control circuits 100; the MCU is configured to output a pulse width modulation (PWM) signal to the at least two LED driving control circuits 100 according to a control instruction; the control instruction at least includes a night light mode instruction; and the MCU controls, according to the night light mode instruction, some of the LED driving control circuits to be turned off. The control instruction can be an optical signal or radio frequency signal of a remote controller received by a sensor, or a voice instruction received by a voice recognition module. In this embodiment, the driving control device for the LED fan lamp 200 controls a plurality of LED driving control circuits 100 through the MCU, which can specifically selectively control one of the LED driving control circuits 100 to work to achieve stable current outputting, or control the plurality of LED control circuits 100 to work to achieve multi-light combined lighting. The control instruction at least includes the night light mode instruction. When receiving the night light mode instruction, the MCU correspondingly controls turning off of some of the LED driving control circuits. For example, when there are two groups of LED driving control circuits 100, in a night light mode, one group is controlled to be turned off. Or, when there are three groups of LED driving control circuits 100, in the night light mode, one or two groups are controlled to be turned off. The control method can be adjusted according to an actual situation.

Further, the at least two LED driving control circuits 100 at least include a cold light LED driving control circuit and a warm light LED driving control circuit. Specifically, for example, in the night light mode, when it is detected that shared current is too low, causing lighting flickering, the MCU will send a control signal to turn off one of the LED driving control circuits (e.g. to turn off the cold light LED driving control circuit). At this time, the warm light LED driving control circuit can obtain sufficient current to ensure the stability of the light source in the night light mode.

Further, LED colors of the at least two LED driving control circuits 100 are different from each other. In this embodiment, according to the received control instruction, for example, "showing blue light", the MCU generates a PWM signal according to the voice instruction, transmits the PWM signal to a corresponding blue LED driving control circuit, and stops outputting the PWM signal to other LED driving control circuits, thereby showing blue light and achieving diversity of LED driving control.

Figure 2:
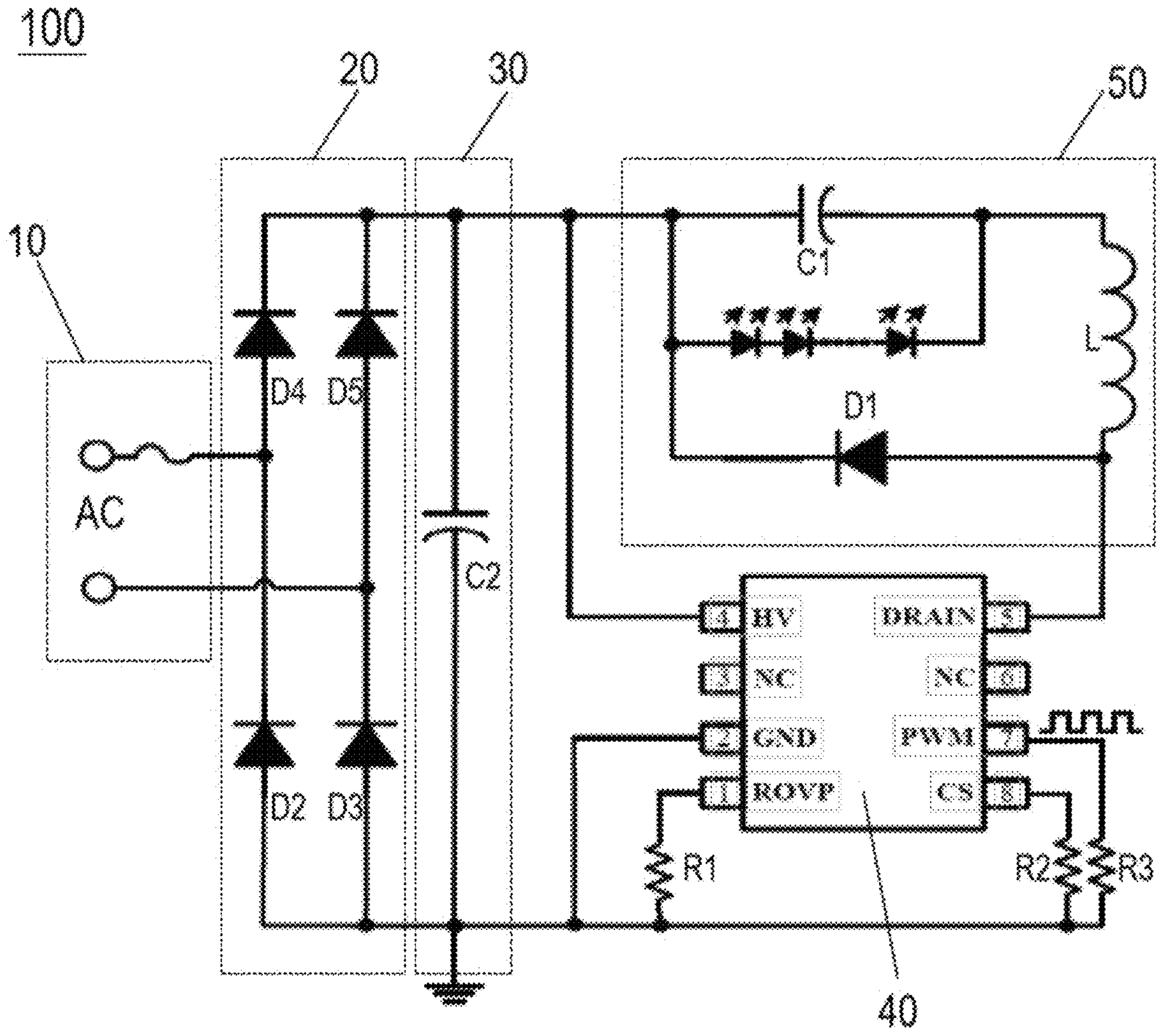
FIG. 2 is a structural block diagram of an LED driving control circuit in FIG. 1.
Figure 3:
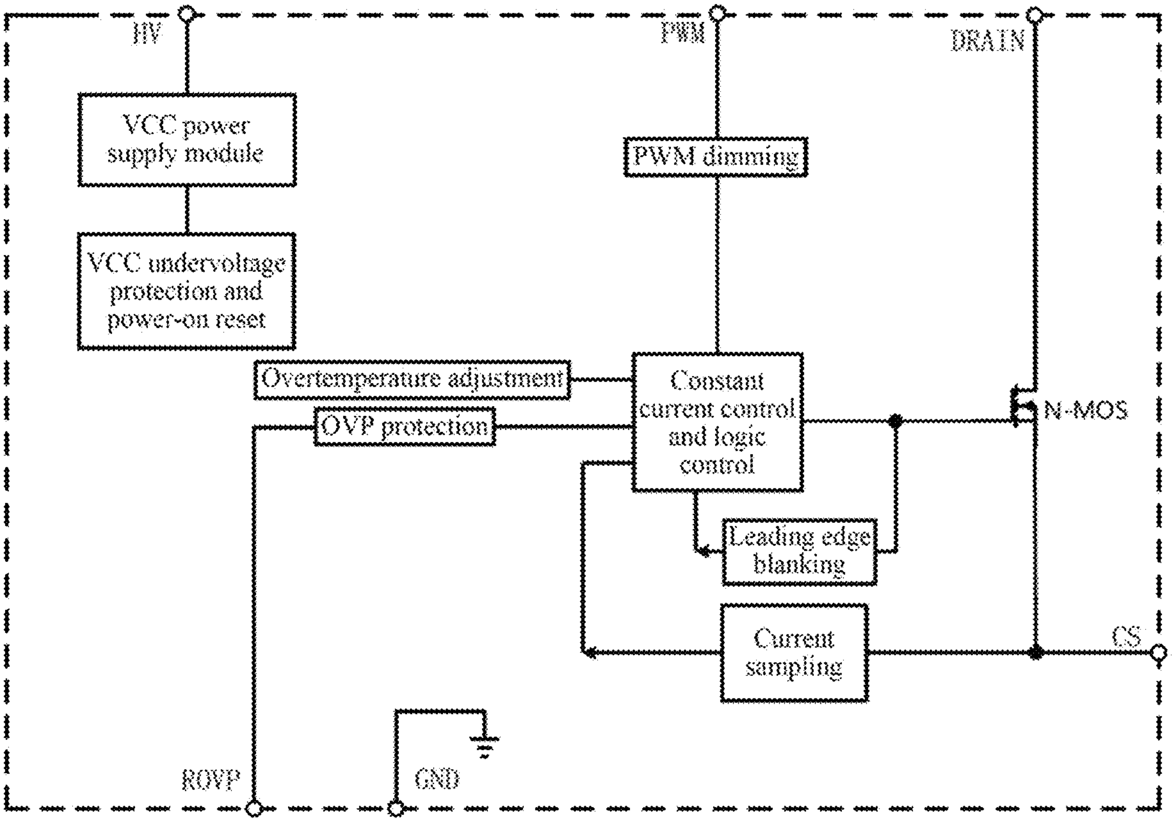
FIG. 3 is a structural block diagram of a driving control chip in FIG. 2.

Referring to FIG. 1 and FIG. 2, each LED driving control circuit 100 specifically includes:

- an input module 10, configured to input alternating current power;
- a rectifier module 20, configured to convert the alternating current power into direct current power;
- a filtration module 30, configured to smooth the direct current power to obtain working power;
- a driving control chip 40, configured to: receive the working power, receive an external PWM signal, and output a driving signal according to the PWM signal; and
- an LED module 50, configured to: receive the working power and the driving signal, and be driven to be lightened.

In this embodiment, the alternating current power is converted into the stable direct current working power through filtration by a rectifier, to meet stable supplying of power to the driving control chip 40 and the LED module 50. The driving control chip 40 outputs the driving signal according to the external PWM signal, thereby driving the LED module 50 to be correspondingly lightened.

Further, the driving control chip 40 includes a high-voltage input (HV) pin, a PWM signal pin, and a driving DRAIN pin; the HV pin is electrically connected to a high voltage output end of the filtration module; the PWM signal pin is configured to receive the external PWM signal; the DRAIN pin is electrically connected to a negative electrode of the LED module; and the high voltage output end of the filtration module is electrically connected to a positive electrode of the LED module. In this embodiment, the HV pin receives the high voltage as input power, and voltage drop is achieved through an internal circuit.

Further, the driving control chip 40 further includes a ground (GND) pin. In this embodiment, the GND pin supplies stable reference voltage.

Further, the driving control chip 40 further includes an open circuit overvoltage protection (ROVP) pin, and the ROVP pin is grounded through a first resistor R1. In this embodiment, the ROVP pin is configured to monitor the input voltage. When the input voltage is high, overvoltage protection is activated to prevent a circuit failure.

Further, the driving control chip 40 further includes a current sensing (CS) pin, and the CS pin is grounded through a second resistor R2. In this embodiment, the CS pin is configured to monitor current. When the current is high, the current is adjusted through a feedback mechanism to ensure stable current.

Further, the PWM signal pin is further grounded through a third resistor R3.

Further, the driving control chip 40 further includes a VCC power supply unit and a VCC undervoltage protection and power-on reset unit; and the HV pin is electrically connected to the VCC undervoltage protection and power-on reset unit through the VCC power supply unit.

Further, the driving control chip 40 further includes a PWM dimming unit and a constant current control and logic control unit; and the PWM dimming unit is electrically connected to the constant current control and logic control unit.

Further, the driving control chip 40 further includes an overtemperature adjustment unit and a constant current control and logic control unit; and the overtemperature adjustment unit is electrically connected to the constant current control and logic control unit.

Further, the driving control chip 40 further includes an overvoltage protection (OVP) unit and a constant current control and logic control unit; the ROVP pin is electrically connected to the constant current control and logic control unit through the OVP unit.

Further, the driving control chip 40 further includes a leading edge blanking unit, a current sampling unit, and an N-metal oxide semiconductor (N-MOS) transistor; an input end of the current sampling unit is electrically connected to the CS pin; an output end of the current sampling unit is electrically connected to the constant current control and logic control unit; a gate G of the N-MOS transistor is electrically connected to an input end of the constant current control and logic control unit and an input end of the leading edge blanking unit; an output end of the leading edge blanking unit is electrically connected to the constant current control and logic control unit; a drain D of the N-MOS transistor is electrically connected to the DRAIN pin; and a source S of the N-MOS transistor is electrically connected to the input end of the current sampling unit.

Further, the LED module 50 includes an LED light string Dn, a first diode D1, an energy storage inductor L, and a first capacitor C1; a high-voltage output end of the filtration module is electrically connected to a positive electrode of the LED light string Dn, a first end of the first capacitor C1, and a negative electrode of the first diode D1; a negative electrode of the LED light string Dn and a second end of the first capacitor C1 are electrically connected to the DRAIN pin through the energy storage inductor L; and a positive electrode of a freewheeling diode is electrically connected to the DRAIN pin. The LED light string Dn is formed by electrically connecting a plurality of LEDs in series in sequence.

Preferably, the filtration module includes a second capacitor C2; a first end of the second capacitor C2 is electrically connected to a high voltage output end of the rectifier module and the high voltage output end of the filtration module; and a second end of the second capacitor C2 is grounded.

Further, the rectifier module includes a second diode D2, a third diode D3, a fourth diode D4, and a fifth diode D5; a positive electrode of the second diode D2 and a positive electrode of the third diode D3 are respectively grounded; a negative electrode of the second diode D2 is electrically connected to a first end of the input module and a positive electrode of the fourth diode D4; a negative electrode of the third diode D3 is electrically connected to a second end of the input module and a positive electrode of the fifth diode D5; and a negative electrode of the fourth diode D4 and a negative electrode of the fifth diode D5 are respectively electrically connected to the high-voltage output end of the rectifier module.

The optimal embodiment of the LED driving control circuit 100 includes all the technical features described above, and its working principle specifically includes:

1. Alternating current power inputting and rectification: After the alternating current power is input, the alternating current power is converted into pulsating direct current power through a rectifier bridge (diode).
2. Filtration: The pulsating direct current is filtered through a filtration capacitor to obtain smooth direct current power.
3. The LED driving control chip works:

The HV pin receives the high voltage as input power, and voltage drop is achieved through an internal circuit.

The GND pin is connected to the ground to provide stable reference voltage.

The ROVP pin monitors the input voltage. When the input voltage is high, overvoltage protection is activated to prevent a circuit failure.

The DRAIN pin is connected to an inductor to adjust the output current by controlling on and off states of the inductor.

The PWM pin outputs a pulse width modulation signal to control the brightness of the LED light string.

The CS pin monitors current. When the current is high, the current is adjusted through a feedback mechanism to ensure stable current.

4. For the inductor L and the first diode D1: The inductor L stores and releases energy under the driving of the control chip, and prevents current from flowing reversely through the first diode D1, to ensure current continuity.
5. The LED light string emits light: The adjusted direct current power drives the LED light string to emit light. The brightness of the LED lamp can be controlled by adjusting the PWM signal.

According to the driving control device for the LED fan lamp provided in the embodiments of the present disclosure, the MCU selectively outputs the PWM signal to the corresponding LED driving control circuits; the control instruction at least includes a night light mode instruction; and when receiving the night light mode instruction, the MCU correspondingly controls turning off of some of the LED driving control circuits, thereby avoiding the problem of light flickering and instability. The driving control device has a simple overall structure, can achieve stable driving control, lowers a demand for resources, saves resources, and enhances the user experience.

In the description of this specification, the description referring to the terms "an embodiment", "some embodiments", "example", "specific examples", "some examples", or the like means that specific features, structures, materials or characteristics described in connection with the embodiments or examples are included in at least one embodiment or example of the present disclosure. In this specification, the schematic representations of the above terms are not necessarily intended to refer to the same embodiment or example. Furthermore, the specific features, structures, materials or characteristics described may be combined in any suitable manner in any one or more embodiments or examples. In addition, those skilled in the art may combine the different embodiments or examples described in this specification, as well as the features of different embodiments or examples, without mutual contradictions.

Although the embodiments of the present disclosure have been shown and described, it can be understood by those of ordinary skill in the art that various changes, modifications, substitutions, and variations can be made to these embodiments without departing from the principle and purpose of the present disclosure. The scope of the present disclosure is defined by the claims and their equivalents.

What is claimed is:

1. A driving control device for a light-emitting diode (LED) fan lamp, comprising a micro control unit (MCU) and at least two LED driving control circuits; the MCU is configured to selectively output a pulse width modulation (PWM) signal to the at least two LED driving control circuits according to a control instruction, to drive LED modules in the corresponding LED driving control circuits; the control instruction at least comprises a night light mode instruction; and the MCU controls, according to the night light mode instruction, some of the LED driving control circuits being turned off;

wherein each driving control circuit comprises:

an input module, configured to input alternating current power;

a rectifier module, configured to convert the alternating current power into direct current power;

a filtration module, configured to smooth the direct current power to obtain working power;

a driving control chip, configured to: receive the working power, receive an external PWM signal, and output a driving signal according to the PWM signal; and an LED module, configured to: receive the working power and the driving signal, and be driven being lightened;

wherein the driving control chip comprises a high-voltage input (HV) pin, a PWM signal pin, and a driving DRAIN pin; the HV pin is electrically connected to a high voltage output end of the filtration module; the PWM signal pin is configured to receive the external PWM signal; the DRAIN pin is electrically connected to a negative electrode of the LED module; and the high voltage output end of the filtration module is electrically connected to a positive electrode of the LED module;

wherein the driving control chip further comprises a ground (GND) pin; or, the driving control chip further comprises an open circuit overvoltage protection (ROVP) pin, and the ROVP pin is grounded through a first resistor (R1); or, the driving control chip further comprises a current sensing (CS) pin, and the CS pin is grounded through a second resistor (R2); or, the PWM signal pin is further grounded through a third resistor R3;

wherein the driving control chip further comprises a VCC power supply unit and a VCC undervoltage protection and power-on reset unit; the HV pin is electrically connected to the VCC undervoltage protection and power-on reset unit through the VCC power supply unit; or, the driving control chip further comprises a PWM dimming unit and a constant current control and logic control unit; the PWM dimming unit is electrically connected to the constant current control and logic control unit; or, the driving control chip further comprises an overtemperature adjustment unit and a constant current control and logic control unit; the overtemperature adjustment unit is electrically connected to the constant current control and logic control unit; or, the driving control chip further comprises an overvoltage protection (OVP) unit and a constant current control and logic control unit; the ROVP pin is electrically connected to the constant current control and logic control unit through the OVP unit; or, the driving control chip further comprises a leading edge blanking unit, a current sampling unit, and an N-metal oxide semiconductor (N-MOS) transistor; an input end of the current sampling unit is electrically connected to the CS pin; an output end of the current sampling unit is electrically connected to the constant current control and logic control unit; a gate G of the N-MOS transistor is electrically connected to an input end of the constant current control and logic control unit and an input end of the leading edge blanking unit; an output end of the leading edge blanking unit is electrically connected to the constant current control and logic control unit; a drain D of the N-MOS transistor is electrically connected to the DRAIN pin; and a source S of the N-MOS transistor is electrically connected to the input end of the current sampling unit.

2. The driving control device for the LED fan lamp according to claim 1, wherein the LED module comprises an LED light string (Dn), a first diode (D1), an energy storage inductor (L), and a first capacitor (C1); a high-voltage output end of the filtration module is electrically connected to a positive electrode of the LED light string (Dn), a first end of the first capacitor (C1), and a negative electrode of the first diode (D1); a negative electrode of the LED light string (Dn) and a second end of the first capacitor (C1) are electrically connected to the DRAIN pin through the energy storage inductor (L); and a positive electrode of a freewheeling diode is electrically connected to the DRAIN pin.

3. The driving control device for the LED fan lamp according to claim 1, wherein the filtration module comprises a second capacitor (C2); a first end of the second capacitor (C2) is electrically connected to a high voltage output end of the rectifier module and the high voltage output end of the filtration module; and a second end of the second capacitor (C2) is grounded.

4. The driving control device for the LED fan lamp according to claim 3, wherein the rectifier module comprises a second diode (D2), a third diode (D3), a fourth diode (D4), and a fifth diode (D5); a positive electrode of the second diode (D2) and a positive electrode of the third diode (D3) are respectively grounded; a negative electrode of the second diode (D2) is electrically connected to a first end of the input module and a positive electrode of the fourth diode (D4); a negative electrode of the third diode (D3) is electrically connected to a second end of the input module and a positive electrode of the fifth diode (D5); and a negative electrode of the fourth diode (D4) and a negative electrode of the fifth diode (D5) are respectively electrically connected to the high-voltage output end of the rectifier module.

5. The driving control device for the LED fan lamp according to claim 1, wherein the at least two LED driving control circuits at least comprise a cold light LED driving control circuit and a warm light LED driving control circuit.

6. The driving control device for the LED fan lamp according to claim 1, wherein LED colors of the at least two LED driving control circuits are different from each other.

* * * * *